United States Patent
Azuma et al.

(10) Patent No.: US 7,964,690 B2
(45) Date of Patent: Jun. 21, 2011

(54) METHACRYLIC RESIN AND PROCESS FOR PRODUCING THEREROF

(75) Inventors: Naoki Azuma, Tokyo (JP); Kohei Okumura, Tokyo (JP); Kazunori Kozawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 734 days.

(21) Appl. No.: 11/992,382

(22) PCT Filed: Nov. 17, 2006

(86) PCT No.: PCT/JP2006/323000
§ 371 (c)(1),
(2), (4) Date: Mar. 21, 2008

(87) PCT Pub. No.: WO2007/060891
PCT Pub. Date: May 31, 2007

(65) Prior Publication Data
US 2009/0239050 A1   Sep. 24, 2009

(30) Foreign Application Priority Data

Nov. 24, 2005  (JP) ................................. 2005-337991
Apr. 25, 2006  (JP) ................................. 2006-120539

(51) Int. Cl.
*C08F 118/02*  (2006.01)
*C08F 20/06*   (2006.01)
*B32B 27/30*   (2006.01)

(52) U.S. Cl. ...................... 526/319; 526/318.6; 428/220

(58) Field of Classification Search .................. 526/319, 526/318.6; 428/220
See application file for complete search history.

(56) References Cited

U.S. PATENT DOCUMENTS

| | | | |
|---|---|---|---|
| 6,252,002 B1 * | 6/2001 | Yamada et al. ............... | 525/228 |
| 6,433,048 B2 * | 8/2002 | Kasai ........................... | 524/244 |
| 2002/0165323 A1 | 11/2002 | Kasai | |
| 2007/0112096 A1 | 5/2007 | Kasai et al. | |

FOREIGN PATENT DOCUMENTS

| | | |
|---|---|---|
| EP | 0 894 828 A1 | 2/1999 |
| GB | 846519 | 8/1960 |
| JP | 01-022865 B | 6/1983 |
| JP | 1-22865 | 4/1989 |
| JP | 2-208308 | 8/1990 |
| JP | 02-208308 A | 8/1990 |
| JP | 4-277545 | 10/1992 |
| JP | 04-277545 A | 10/1992 |
| JP | 6-239938 | 8/1994 |
| JP | 06-239938 A | 8/1994 |
| JP | 9-207196 | 8/1997 |
| JP | 09-207196 A | 8/1997 |
| JP | 10-17626 | 1/1998 |
| JP | 10-017626 A | 1/1998 |
| JP | 2000-256527 | 9/2000 |
| JP | 2000-256527 A | 9/2000 |
| JP | 2002-371104 | 12/2002 |
| JP | 2002-371104 A | 12/2002 |
| JP | 2004-339442 | 12/2004 |
| JP | 2004-339442 A | 12/2004 |
| JP | 2006-193647 | 7/2006 |
| JP | 2006-193647 A | 7/2006 |
| JP | 2006-241226 | 9/2006 |
| JP | 2006-241226 A | 9/2006 |
| JP | 2007-145882 | 6/2007 |
| WO | 2005/012425 | 2/2005 |
| WO | WO 2005/012425 A1 | 10/2005 |

OTHER PUBLICATIONS

International Search Report (PCT/ISA/210) of International Application PCT/JP2006/323000 (mailed on Feb. 13, 2007).
European Search Report dated Feb. 17, 2010 and issued in corresponding European Patent Application 06832878.0.

* cited by examiner

*Primary Examiner* — Michael M Bernshteyn
(74) *Attorney, Agent, or Firm* — Staas & Halsey LLP

(57) ABSTRACT

A methacrylic resin comprising 80 to 98.5 wt % of methyl methacrylate monomer unit and 1.5 to 20 wt % of at least one different vinyl monomer unit copolymerizable with methyl methacrylate, characterized in that the methacrylic resin has a weight average molecular weight measured by gel permeation chromatography (GPC) of 60,000 to 230,000 and comprises 7 to 30% of a component having a weight average molecular weight of 1/5 or less of a peak weight average molecular weight (Mp) obtained from a GPC elution curve based on the methacrylic resin component.

23 Claims, 4 Drawing Sheets

[Figure 1]
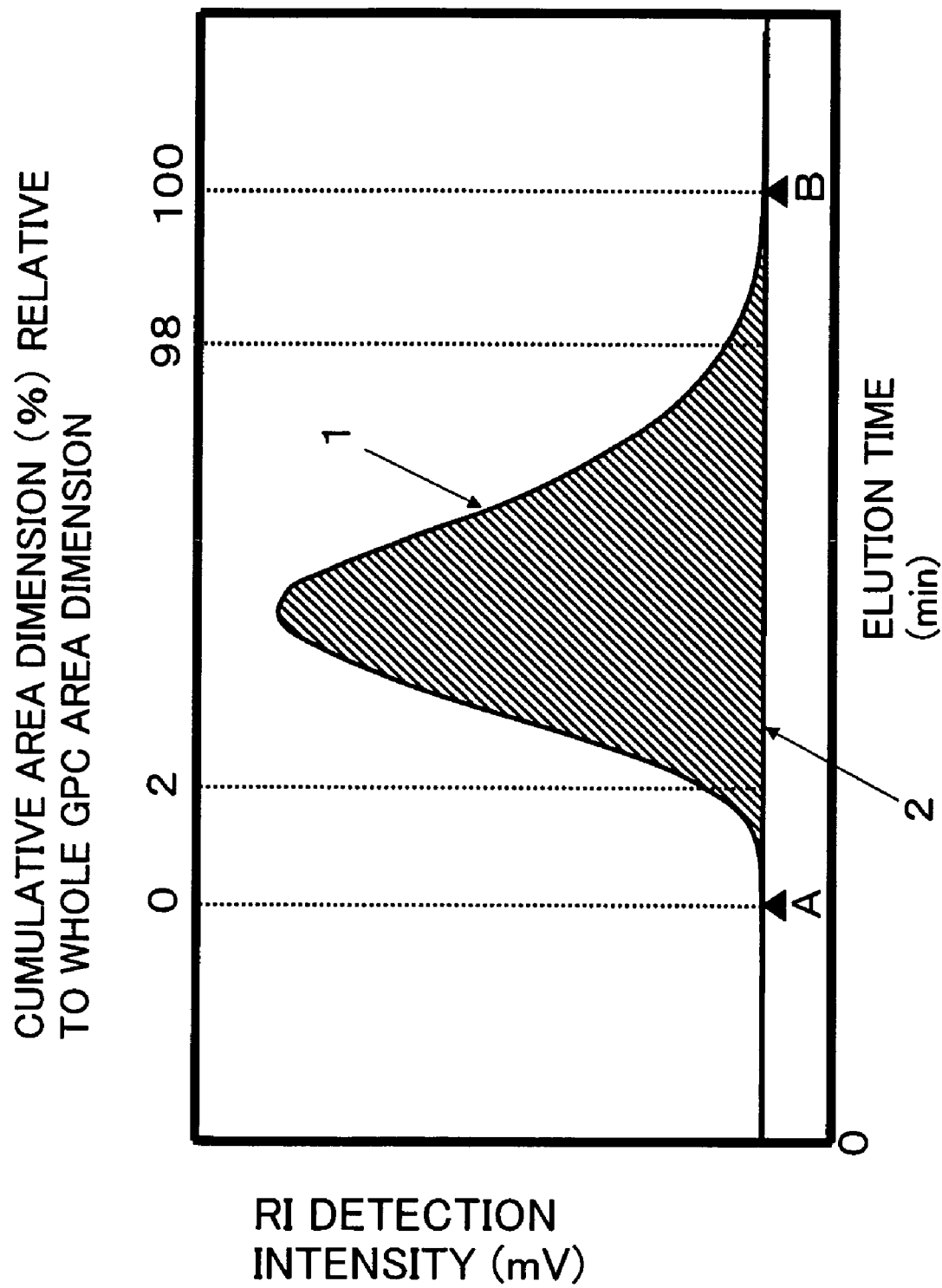

[Figure 2]
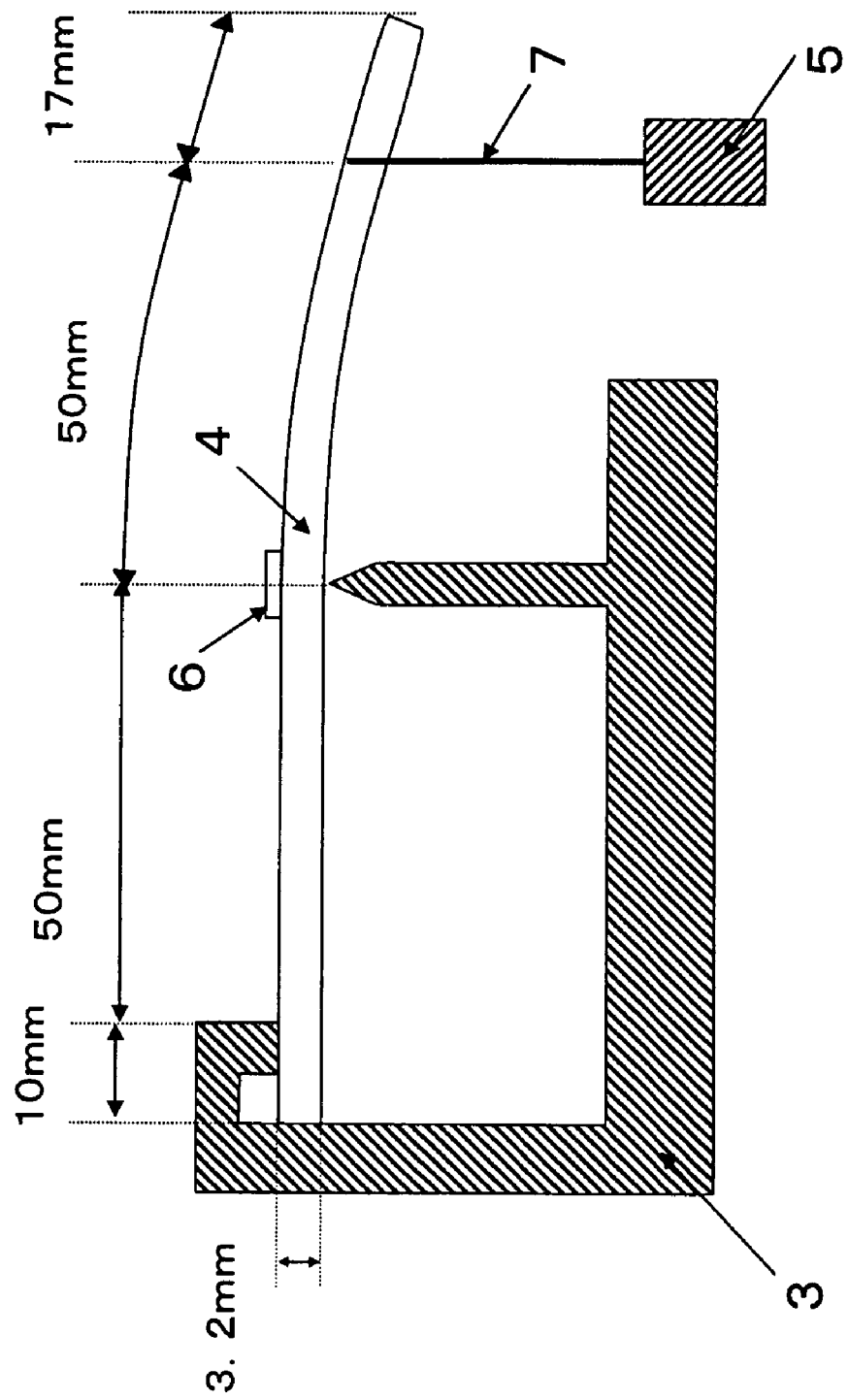

[Figure 3]
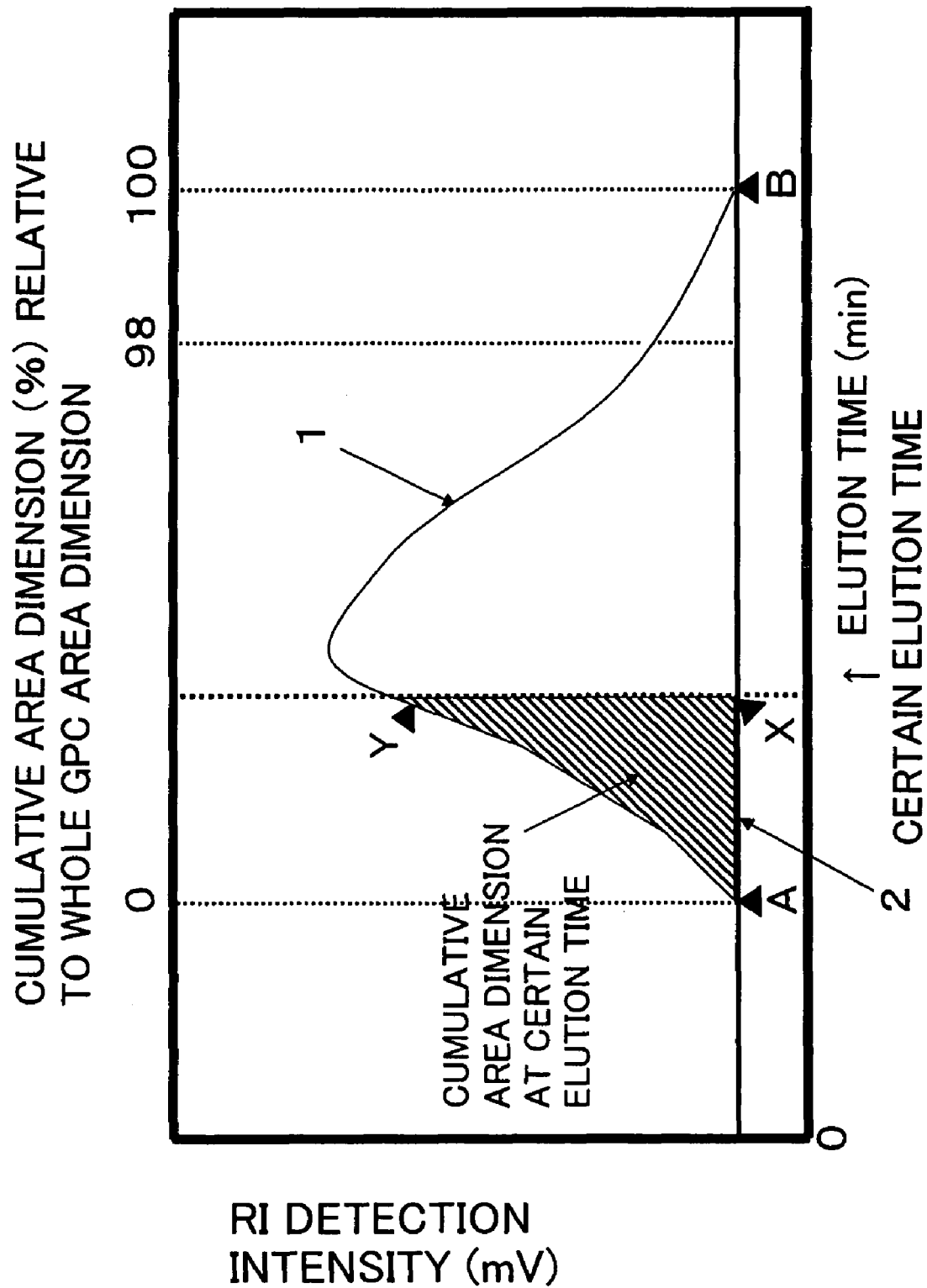

[Figure 4]
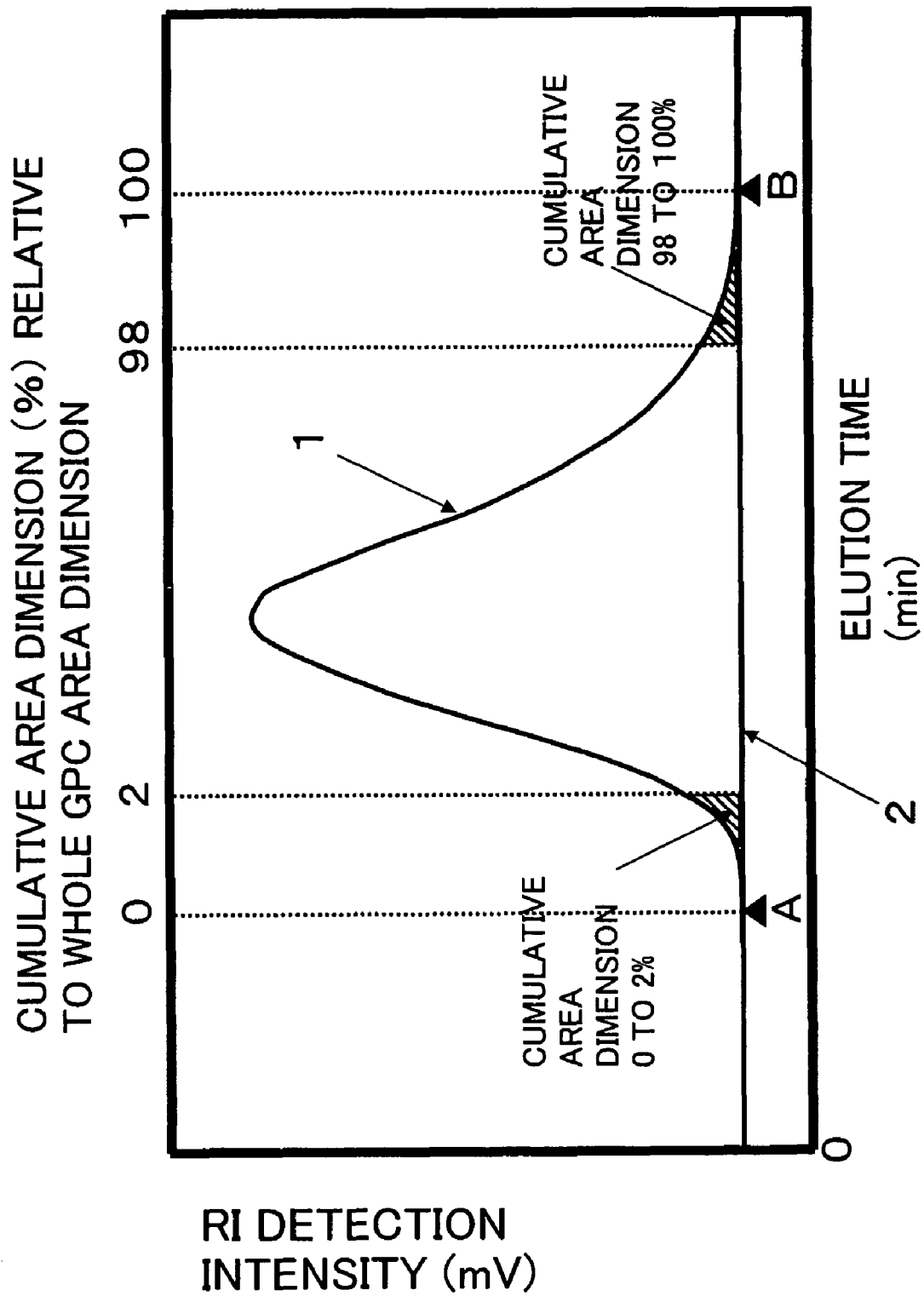

US 7,964,690 B2

METHACRYLIC RESIN AND PROCESS FOR PRODUCING THEREROF

CROSS REFERENCE TO RELATED APPLICATIONS

This application claims the benefit under 35 U.S.C. Section 371, of PCT International Application No. PCT/JP2006/323000, filed Nov. 17, 2006, which claimed priority to Japanese Patent Application Nos. 2005-337991, filed Nov. 24, 2005, and 2006-120539, filed Apr. 25, 2006 in Japan, the contents of which are incorporated herein by reference.

TECHNICAL FIELD

The present invention relates to a methacrylic resin having improved flowability and moldability essential in processing such as injection molding, extrusion molding, blow molding, vacuum forming, air pressure forming and stretch molding while maintaining the heat resistance, appearance of molded articles, low occurrence of cracks and deformation of molded articles in environmental tests and mechanical strength such as solvent resistance.

BACKGROUND ART

Methacrylic resins are transparent and have characteristics that they have higher light transmittance, weather resistance and rigidity than other transparent plastic resins, and are used in a wide range of applications including automotive parts, lighting apparatus, building materials, signboards, nameplates, paintings and windows for display devices. Recently, more and more applications require complicated molding. For example, in injection molding of large and thin molded articles, poor flowability of resin leads to an insufficient injection pressure, resulting in failure to mold or causing significant deformation of molded articles. For this reason, high flowability resins that can be molded even at low injection pressure are desired. At the same time, the appearance, mechanical strength such as solvent resistance and heat resistance are required not to be deteriorated.

So far, as a known method for improving the mechanical strength and moldability of methacrylic resins, a method is generally known in which flowability is provided using a methacrylic resin having a low molecular weight and mechanical strength is provided using a methacrylic resin having a high molecular weight or a slightly crosslinked structure. In this connection, techniques of melt-mixing a high molecular weight or low molecular weight methacrylic resin or widening molecular weight distribution using a branched structure have been reported (see, for example, Patent Documents 1, 2 and 3).

However, in the methacrylic resin described in Patent Document 1, two methacrylic resins having a different molecular weight are only mixed, and high flowability and mechanical strength are not simultaneously satisfied. Further, Patent Document 2 discloses a technique of copolymerization of a large amount of another vinyl monomer copolymerizable with methyl methacrylate and a methacrylic resin of a low molecular weight. However, the resulting methacrylic resin has insufficient flowability.

The process for producing a slightly crosslinked methacrylic resin using a multifunctional monomer described in Patent Document 3 has a problem that control of the multifunctional monomer is extremely difficult. When the amount of the multifunctional monomer is too large, homogeneity in mixing is reduced and the appearance of molded articles is deteriorated. On the other hand, when the amount of the multifunctional monomer is too small, the advantage of improvement of flowability and maintaining mechanical strength is not found.

Patent Document 1: JP-B-1-22865
Patent Document 2: JP-A-4-277545
Patent Document 3: JP-A-9-207196

DISCLOSURE OF THE INVENTION

Problems to be Solved by the Invention

An object of the present invention is to provide a methacrylic resin having improved flowability and moldability essential in processing such as injection molding, extrusion molding, blow molding, vacuum forming, air pressure forming and stretch molding while maintaining the heat resistance, appearance of molded articles, low occurrence of cracks and deformation of molded articles in environmental tests and mechanical strength such as solvent resistance.

Means for Solving the Problems

The present inventors have conducted intensive studies to solve the above problems, and as a result have found that by preparing a methacrylic resin containing a specific low molecular weight component at a specific ratio, a methacrylic resin can be obtained, which has improved flowability and moldability essential in processing such as injection molding, extrusion molding, blow molding, vacuum forming, air pressure forming and stretch molding while maintaining heat resistance, appearance of molded articles, low occurrence of cracks and deformation of molded articles in environmental tests and mechanical strength such as solvent resistance. Accordingly, the present invention is as described below.

[1]
A methacrylic resin characterized in that the methacrylic resin comprises 80 to 98.5 wt % of methyl methacrylate monomer unit and 1.5 to 20 wt % of at least one different vinyl monomer unit copolymerizable with methyl methacrylate, has a weight average molecular weight measured by gel permeation chromatography (GPC) of 60,000 to 230,000 and comprises 7 to 30% of a component having a weight average molecular weight of 1/5 or less of a peak weight average molecular weight (Mp) obtained from a GPC elution curve, based on the methacrylic resin component.

[2]
The methacrylic resin according to [1], characterized in that an average percentage Mh (wt %) of another vinyl monomer unit copolymerizable with methyl methacrylate in a methacrylic resin having a weight average molecular weight such that a cumulative area dimension (%) of area dimensions in the GPC elution curve is 0 to 2% and an average percentage Ml (wt %) of another vinyl monomer unit copolymerizable with methyl methacrylate in a methacrylic resin having a weight average molecular weight such that a cumulative area dimension (%) is 98 to 100% have a relationship of the formula (1):

$$(Mh - 0.8) \geq Ml \geq 0 \tag{1}$$

[3]
The methacrylic resin according to [1] or [2], characterized in that an average percentage Mh (wt %) of another vinyl monomer unit copolymerizable with methyl methacrylate in a methacrylic resin having a weight average molecular weight such that a cumulative area dimension of area dimensions in the GPC elution curve is 0 to 2% and an average percentage Ml (wt %) of another vinyl monomer unit copolymerizable with methyl methacrylate in a methacrylic resin having a weight average molecular weight such that a cumulative area dimension (%) is 98 to 100% have a relationship of the formula (2):

$$(Mh-2) \geq Ml \geq 0 \qquad (2)$$

[4]

The methacrylic resin according to any one of [1] to [3], characterized in that the methacrylic resin has a weight average molecular weight of 60,000 to 180,000.

[5]

The methacrylic resin according to any one of [1] to [4], characterized in that the resin comprises 8 to 20% of the component having a weight average molecular weight of ⅕ or less of a peak weight average molecular weight (Mp) in the GPC elution curve, based on the methacrylic resin component.

[6]

A process for producing a methacrylic resin having a weight average molecular weight measured by gel permeation chromatography (GPC) of 60,000 to 230,000 and comprising 7 to 30% of a component having a weight average molecular weight of ⅕ or less of a peak weight average molecular weight (Mp) in a GPC elution curve, characterized in that the process comprises the steps of:
preparing 5 to 40 wt %, based on the whole methacrylic resin, of a copolymer (1) which comprises 80 to 98.5 wt % of methyl methacrylate monomer unit and 1.5 to 20 wt % of a monomer unit composed of at least one different vinyl monomer copolymerizable with methyl methacrylate and has a weight average molecular weight measured by gel permeation chromatography of 5,000 to 50,000;
and preparing 95 to 60 wt %, based on the whole methacrylic resin, of a copolymer (2) having a weight average molecular weight of 70,000 to 250,000 by adding a raw material mixture containing methyl methacrylate in the presence of the copolymer (1).

[7]

The process for producing a methacrylic resin according to [6], characterized in that a percentage Mal (wt %) of another vinyl monomer copolymerizable with methyl methacrylate in the copolymer (1) and a percentage Mah (wt %) of another vinyl monomer copolymerizable with methyl methacrylate in the copolymer (2) have a relationship of the formula (3):

$$(Mah-0.8) \geq Mal \geq 0 \qquad (3)$$

[8]

The process for producing a methacrylic resin according to [6] or [7], characterized in that Mah (wt %) in the copolymer (1) and Mal (wt %) in the copolymer (2) have a relationship of the formula (4):

$$(Mah-2) \geq Mal \geq 0 \qquad (4)$$

[9]

The process for producing a methacrylic resin according to any one of [6] to [8], characterized in that the methacrylic resin has a weight average molecular weight of 60,000 to 180,000.

[10]

The process for producing a methacrylic resin according to any one of [6] to [9], characterized in that the resin comprises 8 to 20% of a component having a weight average molecular weight of ⅕ or less of a peak weight average molecular weight (Mp) in the GPC elution curve, based on the methacrylic resin component.

[11]

A molded article of the methacrylic resin according to any one of [1] to [5], which has a maximum thickness of 1.5 mm or less.

[12]

A molded article of the methacrylic resin according to any one of [1] to [5], which has a maximum thickness of 10 mm or more.

Effects of the Invention

The present invention provides a methacrylic resin having improved flowability and moldability essential in processing such as injection molding, extrusion molding, blow molding, vacuum forming, air pressure forming and stretch molding while maintaining heat resistance, appearance of molded articles, low occurrence of cracks and deformation of molded articles in environmental tests and mechanical strength such as solvent resistance.

BRIEF DESCRIPTION OF THE DRAWINGS

FIG. 1 illustrates the GPC area of the methacrylic resin of the present invention. The vertical axis of the graph represents RI (reflective index) detection intensity (mV), the lower horizontal axis of the graph represents elution time (min) and the upper horizontal axis represents cumulative area dimension (%) relative to the whole GPC area dimension.

FIG. 2 is a schematic view of a cantilever method used in Examples, Comparative Examples and Reference Examples.

FIG. 3 illustrates an example of cumulative area dimension.

FIG. 4 is a schematic view illustrating positions of a cumulative area dimension of 0 to 2% and a cumulative area dimension of 98 to 100% in a GPC elution curve measurement graph.

DESCRIPTION OF SYMBOLS

1. GPC elution curve (curve formed of RI detection intensities at respective elution times)
2. baseline
3. fixing tool
4. test piece
5. weight of 3 kg
6. filter paper impregnated with ethanol
7. kite string

BEST MODE FOR CARRYING OUT THE INVENTION

The present invention is described in more detail below. The methacrylic resin of the present invention comprises methyl methacrylate and another vinyl monomer copolymerizable with methyl methacrylate. The content of the methyl methacrylate unit in the methacrylic resin is 80 to 98.5 wt %. The content is 98.5 wt % or less in view of the thermal decomposability of the resin. When the content is in this range, generation of bubbles due to foaming of monomers produced by decomposition of the resin, which are called silvers, can be prevented. Also, the content is 80 wt % or more in view of the heat resistance. High heat resistance prevents deformation of molded articles in environmental tests.

Another vinyl monomer copolymerizable with methyl methacrylate influences flowability and heat resistance. Examples of other vinyl monomers copolymerizable with methyl methacrylate include the following:

alkyl methacrylate having 2 to 18 carbon atoms in the alkyl group and alkyl acrylate having 1 to 18 carbon atoms in the alkyl group;

α,β-unsaturated acids such as acrylic acids and methacrylic acids, unsaturated group-containing divalent carboxylic acid such as maleic acid, fumaric acid and itaconic acid and alkyl esters thereof;

aromatic vinyl compounds such as styrene, α-methyl styrene and styrene containing substituents in the benzene ring;

vinyl cyanide compounds such as acrylonitrile and methacrylonitrile;

maleic anhydride, maleimide, N-substituted maleimide, etc;

compounds in which the hydroxyl group on both terminals of ethylene glycol or an oligomer thereof is esterified by acrylic acid or methacrylic acid, such as ethylene glycol di(meth)acrylate, diethylene glycol di(meth)acrylate, triethylene glycol di(meth)acrylate and tetraethylene glycol di(meth)acrylate;

compounds in which two hydroxyl groups in alcohol is esterified by acrylic acid or methacrylic acid, such as neopentyl glycol di(meth)acrylate and di(meth)acrylate;

compounds produced by esterifying polyhydric alcohol derivatives by acrylic acid or methacrylic acid, such as trimethylolpropane and pentaerythritol; and multifunctional monomers such as divinylbenzene.

These may be used alone or in combination of two or more. Of these, in view of the light resistance, heat resistance and flowability, methyl acrylate, ethyl acrylate, n-propyl acrylate, n-butyl acrylate, sec-butyl acrylate and 2-ethylhexyl acrylate can be preferably used. Methyl acrylate, ethyl acrylate and n-butyl acrylate are particularly preferred and methyl acrylate is most preferred due to availability.

The content of another vinyl monomer unit copolymerizable with methyl methacrylate is 1.5 to 20 wt % based on the methacrylic resin. The content is preferably 1.5 wt % or more in view of the flowability and heat resistance. Also, the content is preferably 20 wt % or less in view of the heat resistance. The content is more preferably 1.5 to 17 wt %, further preferably 2 to 15 wt %.

The methacrylic resin of the present invention has a weight average molecular weight measured by gel permeation chromatography (GPC) of 60,000 to 230,000. The weight average molecular weight is preferably 60,000 or more in view of the mechanical strength. The weight average molecular weight is 230,000 or less in view of the flowability. In this range, processing by molding is easy. The weight average molecular weight is preferably 60,000 to 200,000 in view of the flowability. The weight average molecular weight is more preferably 60,000 to 180,000, further preferably 60,000 to 140,000.

The weight average molecular weight in the present invention is measured by gel permeation chromatography (GPC). A calibration curve is previously prepared using a standard monodisperse methacrylic resin having a known weight average molecular weight and available as a reagent and a gel column for analysis through which high molecular weight components are first eluted, based on the elution time and the weight average molecular weight. The molecular weight of each sample can be determined from the resulting calibration curve.

In the present invention, the peak weight average molecular weight (Mp) means a weight average molecular weight showing a peak in a GPC elution curve. When a plurality of peaks are present in a GPC elution curve, the weight average molecular weight with the highest amount is considered as the peak.

The component having a weight average molecular weight of ⅕ or less of Mp present in the methacrylic resin of the present invention is critical to the mechanical strength of the resin and the deformation of molded articles. The component having a weight average molecular weight of ⅕ or less of Mp has a plasticization effect. When the amount of the component is 7 to 30% based on the amount of the methacrylic resin component, the advantages of improvement in moldability and suppression of deformation of molded articles after molding can be obtained. In view of the plasticization effect and the flowability, the amount of the component is 7% or more. When the amount is in this range, the injection pressure when molding can be kept low and deformation of molded articles due to residual strain can be prevented. On the other hand, the amount of the component is 30% or more in view of the heat resistance, suppression of cracks and deformation of molded articles in environmental tests and the strength. The amount of the component is more preferably 8 to 25%, further preferably 8 to 20%. However, in the methacrylic resin component having a weight average molecular weight of 500 or less, a foam-like defect in appearance called silver is easily produced in molding, and therefore, the amount is preferably as small as possible.

In the present invention, preferably the percentage of another vinyl monomer copolymerizable with methyl methacrylate is higher in a high molecular weight component of the resulting methacrylic resin than the percentage in a low molecular weight component. This is because the flowability can be further improved while maintaining the heat resistance, low occurrence of cracks and deformation of molded articles in environmental tests and mechanical strength.

Herein, the area dimension in the GPC elution curve means a shaded area shown in FIG. 1. The area dimension is specifically determined as follows. First, in a GPC elution curve obtained from elution times and detection intensities measured by RI (reflective index detector) in GPC measurement, points at which the baseline automatically drawn by the measurement device and the GPC elution curve intersect are defined as point A and point B. Point A is where the GPC elution curve at an initial elution time and the baseline intersect. Point B is where basically the baseline and the GPC elution curve intersect at a weight average molecular weight of 500 or more. If the two do not intersect at a weight average molecular weight of 500 or more, the value of RI detection intensity at an elution time when a component having a weight average molecular weight of 500 is eluted is determined as point B. The shaded area surrounded by the GPC elution curve between points A, B and line AB is an area in the GPC elution curve. The dimension of the area is an area dimension in the GPC elution curve. In the present invention, a column through which high molecular weight components are first eluted is used, and therefore high molecular weight components are observed at initial elution times, and low molecular weight components are observed at last elution times.

It is considered that, for the cumulative area dimension (%) of area dimensions in a GPC elution curve, point A shown in FIG. 1 is defined as a base point, 0%, of the cumulative area dimension (%), and as detection intensities corresponding to the respective elution times are accumulated toward the end of the elution, the area dimension is formed in the GPC elution curve. FIG. 3 shows a specific example of cumulative area dimension. In FIG. 3, a point on the baseline at a certain elution time is defined as X and a point on the GPC elution curve at the elution time is defined as Y. The ratio of an area surrounded by curve AY, line AB and line XY to the area dimension in the GPC elution curve is defined as cumulative area dimension (%) at the certain elution time.

The average percentage of another vinyl monomer unit copolymerizable with methyl methacrylate in a methacrylic resin having a weight average molecular weight in a cumulative area dimension of 0 to 2% is defined as Mh (wt %). On the other hand, the average percentage of another vinyl monomer unit copolymerizable with methyl methacrylate in a methacrylic resin having a weight average molecular weight in a cumulative area dimension of 98 to 100% is defined as Ml (wt %). FIG. 4 is a schematic view illustrating positions of a cumulative area dimension of 0 to 2% and a cumulative area dimension of 98 to 100% in a measurement graph.

The value of Mh and Ml can be determined by continuously fractioning a few times or several tens of times depending on the size of the column based on the elution time obtained in GPC. The composition of fractionated samples may be analyzed by known pyrolysis gas chromatography.

Mh (wt %) and Ml (wt %) in the present invention preferably has the relationship of the following formula (1).

$$(Mh-0.8) \geq Ml \geq 0 \tag{1}$$

The relationship suggests that the average composition of another vinyl monomer unit copolymerizable with methyl methacrylate is 0.8 wt % or more higher in the high molecular weight component than in the low molecular weight component. It also means that another vinyl monomer is not necessarily copolymerized in the low molecular weight component. The difference between Mh (wt %) and Ml (wt %) is 0.8 wt % or more for improvement in the flowability. The difference is more preferably 1.0 wt %. Further preferably, Mh (wt %) and Ml (wt %) satisfy the following formula (2).

$$(Mh-2) \geq Ml \geq 0 \tag{2}$$

Specifically, when the average composition of another vinyl monomer unit copolymerizable with methyl methacrylate in a methacrylic resin of a high molecular weight component is 2 wt % or more higher than the average composition in a low molecular weight component, a significant effect of improving flowability can be advantageously obtained while maintaining the heat resistance, low occurrence of cracks and deformation of molded articles in environmental tests and mechanical strength. However, in applications which require heat resistance, the average composition of another vinyl monomer unit copolymerizable with methyl methacrylate is 2 wt % or less in total in some cases. In such cases, preferably the formula (5) is satisfied. This is because a methacrylic resin having balanced heat resistance, flowability and mechanical strength can be obtained.

$$1.2 \geq (Mh-0.8) \geq Ml \geq 0 \tag{5}$$

To summarize, preferably Mh (wt %) is 2 wt % or less and the difference of Mh (wt %) and Ml (wt %) is maintained at 0.8 wt % or more. This is because an effect of improving flowability can be obtained while maintaining the heat resistance, low occurrence of cracks and deformation of molded articles in environmental tests and mechanical strength.

In the present invention, copolymer (1) comprises 80 to 100 wt % of a methyl methacrylate monomer and 0 to 20 wt % of at least one different vinyl monomer copolymerizable with methyl methacrylate. The amount of the other vinyl monomer copolymerizable with methyl methacrylate is preferably small, or such vinyl monomer may not be used. The copolymer (1) has a weight average molecular weight measured by gel permeation chromatography of 5,000 to 50,000. Since components having a weight average molecular weight of 500 or less, which adversely affect molding, are reduced, the copolymer (1) has a weight average molecular weight of 5,000 or more. Such a range is preferred because the molecular weight of copolymer (2) is stable during continuous production of copolymer (2) in the presence of copolymer (1). The copolymer (1) has a weight average molecular weight of 50,000 or less in view of flowability, more preferably 5,000 to 40,000, further preferably 6,000 to 35,000. A most preferred range is 6,000 to 30,000.

Also, copolymer (2) comprises 80 to 99.5 wt % of a methyl methacrylate monomer and 0.5 to 20 wt % of at least one different vinyl monomer copolymerizable with methyl methacrylate. The copolymer (2) has a weight average molecular weight measured by gel permeation chromatography of 70,000 to 250,000. The copolymer (2) has a weight average molecular weight of 70,000 or more in view of the mechanical strength, and 250,000 or less in view of the flowability. The copolymer (2) has a weight average molecular weight of more preferably 70,000 to 230,000, further preferably 75,000 to 180,000.

The ratio of copolymer (1) is 5 to 40 wt %. The ratio is preferably 5 wt % or more in order to achieve the effect of improving flowability. The ratio is 40 wt % or less in view of the mechanical strength of the resin. The ratio is more preferably 5 to 30 wt %, further preferably 5 to 25 wt %.

The ratio of copolymer (2) is preferably 95 to 60 wt %. The ratio is preferably 95 wt % or less in order to achieve the effect of improving flowability. The ratio is preferably 60 wt % or more in view of the mechanical strength of the resin.

The process for producing the composition of the methacrylic resin of the present invention is not particularly limited, and specifically, the following processes may be employed:

1. A process comprising previously preparing polymer (A), mixing polymer (A) with a raw material composition mixture of polymer (B) having a molecular weight different from that of polymer (A), and polymerizing the mixture;

2. A process comprising previously preparing polymer (A), adding serially a raw material composition mixture of polymer (B) having a molecular weight different from that of polymer (A) to polymer (A) or adding serially polymer (A) to a raw material composition mixture of polymer (B), and polymerizing the mixture; and 3. A process comprising previously preparing polymer (A) and polymer (B) having a molecular weight different from that of polymer (A) separately, and mixing them.

In these processes, two components having a different molecular weight are used. In processes 1 and 2, polymer (C) and polymer (D) having a different molecular weight composition may also be prepared through the same procedure. Further, in process 3, polymer (C) or polymer (D) having a different molecular weight composition may be blended and melt-kneaded in an extruder.

A process comprising preparing polymer (A) and preparing polymer (B) with polymer (A) being present in a raw material composition mixture of polymer (B) is preferred. Such a process is preferred because controlling the composition of polymer (A) and polymer (B) is easy, temperature increase during polymerization due to heat generation can be prevented and the viscosity in the system can be stable. In that case, polymerization of the raw material composition mixture of polymer (B) may be partly started. For the polymerization method, bulk polymerization, solution polymerization, suspension polymerization or emulsion polymerization is preferred. Bulk polymerization, solution polymerization and suspension polymerization are more preferred.

One of polymer (A) and polymer (B) may have a high molecular weight and the other may have a low molecular weight. Polymer (A) and polymer (B) preferably have a different composition.

When the content of another vinyl monomer copolymerizable with methyl methacrylate is, for example, 1.5 to 20 wt % based on the methacrylic resin, the content is preferably different in polymer (A) and polymer (B).

Preferably, polymer (A) corresponds to copolymer (1) having a low molecular weight, and polymer (B) corresponds to copolymer (2) having a high molecular weight. More preferably, the process of polymerization comprises preparing copolymer (1) and then preparing copolymer (2) in the presence of copolymer (1).

In the present invention, the percentage Mal (wt %) of another vinyl monomer unit copolymerizable with methyl methacrylate in copolymer (1) and the percentage Mah (wt %) of another vinyl monomer unit copolymerizable with methyl methacrylate in copolymer (2) preferably have a relationship of the following formula (3):

$$(Mah-0.8) \geq Mal \geq 0 \qquad (3).$$

The percentages Mal and Mah can be determined by measuring copolymer (1) and copolymer (2) by pyrolysis gas chromatography. The values obtained thereby are substantially the same as the percentages employed when charged.

The difference between Mah (wt %) and Mal (wt %) is 0.8 wt % or more in view of the flowability. It is preferred that copolymer (1) having a high molecular weight contains another vinyl monomer copolymerizable with methyl methacrylate at a larger percentage because flowability can be improved while maintaining heat resistance and mechanical strength.

When the relationship of the formula (4) is satisfied, flowability is more advantageously significantly improved while maintaining the heat resistance, low occurrence of cracks and deformation in molded articles in environmental tests and mechanical strength.

$$(Mah-2) \geq Mal \geq 0 \qquad (4)$$

However, in applications which require heat resistance, the average composition of another vinyl monomer unit copolymerizable with methyl methacrylate in the whole methacrylic resin is 2 wt % or less in some cases. In such cases, when the formula (6) is satisfied, a methacrylic resin having balanced heat resistance, flowability and mechanical strength can be obtained.

$$1.2 \geq (Mah-0.8) \geq Mal \geq 0 \qquad (6)$$

Specifically, preferably Mah (wt %) is 2 wt % or less and the difference from Mal (wt %) is maintained at 0.8 wt % or more in order to improve the flowability while maintaining the heat resistance, low occurrence of cracks and deformation of molded articles in environmental tests and mechanical strength.

For the polymerization initiator for preparing the high flowability methacrylic resin of the present invention, the following common radical polymerization initiators can be used when employing free radical polymerization:

peroxides such as di-t-butyl peroxide, lauroyl peroxide, dilauroyl peroxide, t-butylperoxy-2-ethylhexanoate, 1,1-bis(t-butylperoxy)-3,3,5-trimethylcyclohexane and 1,1-bis(t-butylperoxy)cyclohexane;

azo types such as azobisisobutyronitrile, azobisisovaleronitrile and 1,1-azobis(1-cyclohexanecarbonitrile), etc.

These may be used alone or in combination of two or more. Such a radical initiator in combination with an appropriate reducing agent may also be used as a redox initiator. Generally, 0.001 to 1 wt % of the initiator is used based on the amount of the monomer mixture.

When the methacrylic resin of the present invention is produced by radical polymerization, a commonly used chain transfer agent may be used for controlling the molecular weight of polymer (A) and polymer (B). As the chain transfer agent, for example, mercaptans such as n-butyl mercaptan, n-octyl mercaptan, n-dodecyl mercaptan, 2-ethylhexyl thioglycolate, ethylene glycol dithioglycolate, trimethylolpropanetris(thioglycolate) and pentaerythritol tetrakis(thioglycolate) are preferably used. Generally, 0.001 to 1 wt % of the chain transfer agent is used based on the amount of the monomer mixture. The same or different chain transfer agent may be used for polymer (A) and polymer (B). The amount of the chain transfer agent for polymer (A) and polymer (B) is determined according to the desired molecular weight.

The following additives may be used for the methacrylic resin of the present invention:

dyes, pigments, heat stabilizers such as hindered phenols or phosphates;

ultraviolet absorbers such as benzotriazole, 2-hydroxybenzophenone and salicylic acid phenyl ester;

plasticizers such as phthalic acid esters, fatty acid esters, trimellitic acid esters, phosphoric acid esters and polyesters;

mold release agents such as higher fatty acids, higher fatty acid esters and higher fatty acid mono-, di- or triglycerides;

lubricants such as fatty acid esters and polyolefins;

anti-static agents such as polyethers, polyether esters, polyether ester amides, alkyl sulfonates and alkylbenzene sulfonates;

flame retardants such as phosphoruses, phosphoruses/chlorines, phosphoruses/bromines;

reinforcing agents such as acrylic rubbers obtained by multi-stage polymerization;

organic and organo-mineral light diffusing agents such as methyl methacrylate/styrene polymer beads and organic siloxane beads; and inorganic light diffusing agents such as barium sulfate, titanium oxide, calcium carbonate and talc.

The light diffusing agent is effective for preventing glaring of reflected light.

The method of adding such additives is not particularly limited. For example, a method comprising previously dissolving an additive in a monomer mixture and polymerizing the mixture, or a method of adding an additive, comprising homogeneously mixing an additive and the resulting methacrylic resin using a blender or a tumbler and compounding the mixture by an extruder is employed.

The methacrylic resin of the present invention may be used alone or in a mixture with another resin. When mixing with another resin, the resins may be blended and melt-mixed by heating, or plural kinds of pellets melt-mixed by heating and extruded may be blended and melt-mixed by heating. The above-described additives may be blended and mixed at this stage.

To obtain the methacrylic resin of the present invention, methacrylic resin compositions according to the present invention having a different composition may be combined or such a methacrylic resin composition may be combined with an existing methacrylic resin. For combining the resin, the respective resins may be blended, or once melted by heating and extruded and then blended again and pelletized.

The methacrylic resin of the present invention is suitable for injection molded articles having a maximum thickness of 1.5 mm or less.

The resin is easily injection molded and the resulting molded articles have little deformation. Further, in injection molding, thin molded articles are rapidly cooled when removed from the mold and cracks due to deformation during cooling are hardly formed. The maximum thickness is more preferably 1.2 mm or less. Injection molded articles having a maximum thickness of 1.0 mm or less are more preferred.

In particular, such molded articles are suitable for light guide plates having a maximum thickness of 1.5 mm or less and a diagonal length of 200 mm or more, which require high thickness accuracy and optical properties.

The methacrylic resin of the present invention is suitable for injection molded articles having a maximum thickness of 10 mm or more. When the thickness is large, the molding cycle is long because the cooling time is long, but since the methacrylic resin of the present invention has high flowability, molding can be performed at a low resin temperature and a low mold temperature. This makes it possible to shorten the molding cycle and prevent sink mark or deformation of molded articles. The methacrylic resin of the present invention is suitable for injection molded articles having a maximum thickness of preferably 13 mm or more, more preferably 15 mm or more.

The methacrylic resin of the present invention is particularly suitable for lenses such as convex lenses and concave lenses, which often have a problem of sink mark with the product shape.

EXAMPLES

The present invention is described in more detail with reference to Examples and Comparative Examples below.

[Raw Materials]

The following raw materials were used.

Methyl methacrylate: manufactured by Asahi Kasei Chemicals Corporation (to which 2.5 ppm of 2,4-dimethyl-6-t-butylphenol manufactured by Chugai Boeki Co., Ltd. is added as a polymerization inhibitor)

Methyl acrylate: manufactured by Mitsubishi Chemical Corporation (to which 14 ppm of 4-methoxyphenol manufactured by Kawaguchi Chemical Industry Co., Ltd. is added as a polymerization inhibitor)

n-octyl mercaptan: manufactured by Arkema 2-ethylhexyl thioglycolate: manufactured by Arkema lauroyl peroxide: manufactured by NOF Corporation tribasic calcium phosphate: manufactured by Nippon Chemical Industrial Co., Ltd., used as a suspending agent calcium carbonate: manufactured by SHIRAISHI KOGYO KAISHA, LTD., used as a suspending agent sodium lauryl sulfate manufactured by Wako Pure Chemical Industries Ltd., used as a suspending auxiliary.

[Measurement Method]

[I. Measurement of Composition and Molecular Weight of Resin]

1. Analysis of Composition of Methacrylic Resin

The composition of the methacrylic resin was analyzed by pyrolysis gas chromatography and mass spectrometry.

Pyrolyzer: Py-2020D manufactured by FRONTIER LAB

Column: DB-1 (length 30 m, inner diameter 0.25 mm, liquid phase thickness 0.25 μm)

Column temperature program: maintained at 40° C. for 5 minutes, increased to 320° C. at a rate of 50° C./min, maintained at 320° C. for 4.4 minutes.

Temperature in pyrolysis furnace: 550° C.

Temperature at column injection port: 320° C.

Gas chromatography: GC6890 manufactured by Agilent

Carrier: pure nitrogen, flow rate 1.0 ml/min

Injection method: split method (split ratio 1/200)

Detector: mass spectrometer Automass Sun manufactured by JEOL Ltd.

Detection method: electron ionization (ion source temperature: 240° C., interface temperature: 320° C.)

Sample: 10 μl of 0.1 g methacrylic resin in 10 cc chloroform solution

A sample was put in a platinum sample cup for a pyrolyzer and vacuum dried at 150° C. for 2 hours. Then, the sample cup was put in a pyrolysis furnace and the composition of the sample was analyzed under the above conditions. The percentage of the methacrylic resin was determined from the peak area in the total ion chromatography (TIC) of methyl methacrylate and methyl acrylate and the calibration curve of the following standard samples.

Preparation of standard samples for calibration curve: 0.25% of lauroyl peroxide and 0.25% of n-octyl mercaptan were added to 50 g each of five solutions in which the ratio of methyl methacrylate to methyl acrylate (methyl methacrylate/methyl acrylate)=(100%/0%), (98%/2%), (94%/6%), (90%/10%), (80%/20%). The mixed solutions were each put in a 100 cc glass ampule, the inside air was replaced with nitrogen and the ampule was sealed. The glass ampule was put in a water bath at 80° C. for 3 hours and then in an oven at 150° C. for 2 hours. After cooling to room temperature, the glass was broken to collect the methacrylic resin, and the composition was analyzed. A graph of (methyl acrylate area value)/(methyl methacrylate area value+methyl acrylate area value) against charge ratio of methyl acrylate, which was obtained by measurement of standard samples for calibration, was used as a calibration curve.

2. Measurement of Weight Average Molecular Weight of Methacrylic Resin

Measurement apparatus: gel permeation chromatography (LC-908) manufactured by Japan Analytical Industry Co., Ltd.

Column: one JAIGEL-4H and two JAIGEL-2H serially connected

Through the columns, high molecular weight components are first eluted and low molecular weight components are eluted later.

Detector: RI (Refractive Index) detector

Detection sensitivity: 2.4 μV/sec

Sample: 0.450 g methacrylic resin in 15 ml chloroform solution

Injection amount: 3 ml

Developing solvent: chloroform, flow rate 3.3 ml/min

The RI detection intensity of the methacrylic resin relative to the elution time was measured under the above conditions. The average molecular weight of the methacrylic resin was determined from the area dimension in the GPC elution curve and the calibration curve.

The following ten monodisperse methacrylic resins (Easi-Cal PM-1 manufactured by Polymer Laboratories) having a different known weight average molecular weight were used as standard samples for calibration curves.

|  | weight average molecular weight |
| --- | --- |
| Standard Sample 1 | 1,900,000 |
| Standard Sample 2 | 790,000 |
| Standard Sample 3 | 281,700 |
| Standard Sample 4 | 144,000 |
| Standard Sample 5 | 59,800 |
| Standard Sample 6 | 28,900 |
| Standard Sample 7 | 13,300 |
| Standard Sample 8 | 5,720 |
| Standard Sample 9 | 1,936 |
| Standard Sample 10 | 1,020 |

When polymer (1) and polymer (2) are mixed, a GPC elution curve of polymer (1) alone is previously measured to determine the weight average molecular weight, and the ratio of the presence of polymer (1) (ratio of charge in this application) is multiplied by the GPC elution curve of polymer (1), and by subtracting the detection intensity at the elution time from the GPC elution curve of a mixture of polymer (1) and polymer (2), a GPC elution curve of polymer (2) alone is obtained. The weight average molecular weight of polymer (2) was determined from this.

The peak weight average molecular weight (Mp) in the GPC elution curve is determined from the GPC elution curve and the calibration curve.

The content of a component having a weight average molecular weight of 1/5 or less of Mp is determined as follows.

First, the area dimension in the GPC elution curve of the methacrylic resin is determined. The area dimension in the GPC elution curve means a shaded area shown in FIG. 1. The area dimension is specifically determined as follows. First, in a GPC elution curve obtained from elution times and detection intensities measured by RI (reflective index detector) in GPC measurement, points at which the baseline automatically drawn by the measurement device and the GPC elution curve intersect are defined as point A and point B. Point A is where the GPC elution curve at an initial elution time and the baseline intersect. Point B is where basically the baseline and the elution curve intersect at a weight average molecular weight of 500 or more. If the two do not intersect, the value of RI detection intensity at an elution time when a component having a weight average molecular weight of 500 is eluted is determined as point B. The shaded area surrounded by the GPC elution curve between points A, B and the baseline is an area in the GPC elution curve. The dimension of the area is an area dimension in the GPC elution curve. In the present invention, a column through which high molecular weight components are first eluted is used, and therefore high molecular weight components are observed at initial elution times (point A side), and low molecular weight components are observed at last elution times (point B side).

The area dimension in a GPC elution curve is divided at an elution time corresponding to the weight average molecular weight which is 1/5 of Mp to determine the area dimension in the GPC elution curve corresponding to the component having a weight average molecular weight of 1/5 or less of Mp. From the ratio of the area dimension to the area dimension in the GPC elution curve, the ratio of the component having a weight average molecular weight of 1/5 or less of Mp was determined.

3. Measurement of Percentage of Vinyl Monomer Copolymerizable with Methyl Methacrylate in High Molecular Weight Component and Low Molecular Weight Component of Methacrylic Resin In this measurement, compositions of a molecular weight component with a cumulative area dimension of 0 to 2% and a molecular weight component with a cumulative area dimension of 98 to 100% are analyzed. It is considered that, for the cumulative area dimension (%) of area dimensions in a GPC elution curve, point A shown in FIG. 1 is defined as a base point, 0%, of the cumulative area dimension (%), and as detection intensities corresponding to the respective elution times are accumulated toward the end of the elution, the area dimension is formed in the GPC elution curve. FIG. 3 shows a specific example of cumulative area dimension. In FIG. 3, a point on the baseline at a certain elution time is defined as X and a point on the GPC elution curve at the elution time is defined as Y. The ratio of an area surrounded by curve AY, line AB and line XY to the area dimension in the GPC elution curve is defined as cumulative area dimension (%) at a certain elution time.

The molecular weight component with a cumulative area dimension of 0 to 2% and the molecular weight component with a cumulative area dimension of 98 to 100% are fractionated from the column based on the corresponding elution times, and the compositions were analyzed. Measurement and fractionation of each component were performed in the same apparatus and conditions as in 2.

The components were fractionated twice and 10 µl of the fractionated samples was put in the platinum sample cup for a pyrolyzer used in pyrolysis gas chromatography analysis and mass spectrometry in 1, and dried in a vacuum dryer at 100° C. for 40 minutes. The composition of the methacrylic resin corresponding to the cumulative area dimension of the fractioned component was determined under the same conditions as in 1.

[II. Measurement of Practical Properties]

1. Measurement of VICAT Softening Temperature

Molding machine: 30t press molding machine

Test piece: thickness 4 mm

Measurement conditions: in accordance with ISO 306 B50

The VICAT softening temperature was measured under the above conditions. The VICAT softening temperature is employed as an index for the evaluation of heat resistance.

2. Measurement of Spiral Length

The test determines the relative flowability of a resin from the distance that the resin traveled through a spiral cavity with a constant cross sectional area.

Injection molding machine: IS-100EN manufactured by TOSHIBA MACHINES CO., LTD.

Mold for measurement: a mold with a groove having a depth of 2 mm and a width of 12.7 mm engraved on the surface in an Archimedes spiral form from the center Injection Conditions Resin temperature: 250° C.

Mold temperature: 55° C.

Injection pressure: 98 MPa

Injection time: 20 sec

The resin was injected to the center of the mold surface under the above conditions. 40 seconds after completion of the injection, the spiral molded article was removed and the length of the spiral was measured. The length is employed as an index for the evaluation of flowability.

3. Measurement of Time for Break by Cantilever Method

The solvent resistance was evaluated by a measurement method by a cantilever method shown in FIG. 2.

Injection molding machine: IS-100EN manufactured by TOSHIBA MACHINES CO., LTD.

Injection molded article: thickness 3.2 mm, width 12.7 mm, length 127 mm

Injection Conditions

Resin temperature: 230° C.

Mold temperature: 60° C.

Injection pressure: 56 MPa
Injection time: 20 sec
Cooling time: 40 sec

The molded articles molded under the above conditions were kept in a desiccator for a day so as not to absorb water. Subsequently, using a tool 3 shown in FIG. 2, a molded article 4 was positioned as in FIG. 2, a weight 5 of 3 kg to which kite string 7 was attached was put as in FIG. 2, and filter paper 6 impregnated with ethanol was set at the position shown in FIG. 2, and the time from setting of the filter paper 6 to break of the molded article with the weight 5 was measured. The test was repeated 10 times for each sample. The data of the maximum time and the minimum time were deleted and an average time of the rest 8 tests were calculated. The average time is employed as an index for the evaluation of solvent resistance.

[III. Evaluation of Molding]

3-1-1. Molded Article A

Injection molding machine: 350 t electric injection molding machine manufactured by The Japan Steel Works, Ltd.
Molded article size: plate having a width of 240 mm, a length of 135 mm and a thickness of 0.8 mm
Gate: film gate with a width of 240 mm and a thickness of 0.8 mm
Position of gate: center in width direction of molded article
Injection Conditions
Barrel temperature: 275° C.
Mold temperature: 75° C.
Injection rate: 800 mm/sec, constant
Dwell pressure and dwell time: 200 MPa, 20 sec
Removal of molded article: 40 sec after the start of injection Injection molding was performed under the above conditions. At the same time, the maximum injection pressure in injection was compared. The force controllable in the molding machine is 200 MPa, and the maximum force is 240 MPa.

3-1-2. Environmental Test A

Molded article A was hung in a constant temperature constant humidity bath at a temperature of 60° C. and a relative humidity of 90% with a clip on the side opposite from the gate of the molded article and left for 500 hours. The molded article was removed from the constant temperature constant humidity bath and left flat in a room at 25° C. and a relative humidity of 25% for a day. The molded article was put on a surface plate in a flat state and the maximum space between the surface plate and the molded article was measured with a 0.1 mm pitch thickness gauge. The size of the space shows the degree of warping of the molded article. The result is employed as an index for deformation of molded articles. Also, whether cracks were formed or not was visually observed.

3-2-1. Molded Article B

Injection molding machine: 350 t electric injection molding machine manufactured by The Japan Steel Works, Ltd.
Molded article size: plate having a width of 240 mm, a length of 135 mm and a thickness of 0.5 mm
Gate: film gate with a width of 240 mm and a thickness of 0.5 mm
Position of gate: center in width direction of molded article
Injection Conditions
Barrel temperature: 285° C.
Mold temperature: 65° C.
Injection rate: 800 mm/sec, constant
Dwell pressure and dwell time: 200 MPa, 20 sec
Removal of molded article: 40 sec after the start of injection Injection molding was performed under the above conditions. At the same time, the maximum injection pressure in injection was compared.

3-2-2. Environmental Test B

Molded article B was hung in a constant temperature constant humidity bath at a temperature of 50° C. and a relative humidity of 80% with a clip on the side opposite from the gate of the molded article and left for 500 hours. The molded article was removed from the constant temperature constant humidity bath and left flat in a room at 25° C. and a relative humidity of 25% for a day. The molded article was put on a surface plate in a flat state and the maximum space between the surface plate and the molded article was measured with a 0.1 mm pitch thickness gauge. The size of the space shows the degree of warping of the molded article. The result is employed as an index for deformation of molded articles. Also, whether cracks were formed or not was visually observed.

3-3-1. Molding Test C

Injection molding machine: IS-100EN manufactured by TOSHIBA MACHINES CO., LTD.
Molded article: semi-spherical convex lens with a diameter of 40 mm and a radius of 20 mm
Gate: side gate with a thickness of 3 mm, a width of 10 mm and a gate land length of 10 mm
Position of gate: periphery of bottom plane of hemisphere
Runner: thickness 8 mm, width 10 mm, length 20 mm
Injection Conditions
Injection rate: 3 mm/sec
Injection time: 5 sec
Dwell pressure and dwell time: maintained at 140 MPa for 10 sec and then at 60 MPa for 20 sec.

Injection molding of molded article C was performed under the above conditions. Molding was performed with changing the barrel temperature. The maximum injection pressure in molding was adjusted to 50 MPa and the resin temperature at that time was measured. The sink mark at the center of the flat surface of the molded article was measured by surface roughness measuring instrument SURFCOM 558A manufactured by TOKYO SEIMITSU CO., LTD. The time when the instrument read substantially 100 μm or less was determined to be the molding time, and the molding time and the amount of sink mark were compared.

[IV. Polymerization of Resin]

In the following, the process for producing a resin is described.

The amounts of each raw material are shown in Table 1 and the composition of charged monomers, the ratio of polymers and the results of measurement of the weight average molecular weight of the each polymer are shown in Table 2.

[Resin 1]

Raw materials of polymer (1) were put in a 60 L reactor in amounts shown in Table 1 and mixed with stirring. Suspension polymerization was performed at a reaction temperature in the reactor of 80° C. for 150 minutes to prepare polymer (1). The polymer (1) was sampled and the weight average molecular weight was measured by GPC.

Subsequently, the polymer was maintained at 80° C. for 60 minutes and then raw materials of polymer (2) were put in the reactor in amounts shown in Table 1 and the mixture was subjected to suspension polymerization at 80° C. for 90 minutes. The temperature of the mixture was then increased to 92° C. at a rate of 1° C./minute and the mixture was aged for 60 minutes to substantially terminate the polymerization reaction. The resultant was then cooled to 50° C. and 20 wt % sulfuric acid was added thereto to dissolve the suspending agent, and washing, dehydration and drying were performed to give polymer beads. The weight average molecular weight of the polymer beads was measured by GPC. The ratio of polymer (1) contained was multiplied by the GPC elution curve of polymer (1). By subtracting the GPC portion of polymer (1) obtained by the multiplication from the GPC elution curve of the polymer beads, the weight average molecular weight of polymer (2) was determined.

The polymer beads thus obtained were extruded and pelletized by a twin screw extruder at 240° C. The composition and the molecular weight of the pellets were measured by pyrolysis gas chromatography analysis and gel permeation chromatography.

[Resin 2 to Resin 7]

Polymerization using raw materials in the amounts shown in Table 1, measurement and pelletization were performed in the same manner as for resin 1.

[Resin 8]

Raw materials of polymer (1) were put in a 3 L commercially available heat resistant glass bottle in amounts shown in Table 1, and the bottle was closed and immersed in a water bath at 70° C. for 3 hours in a sealed state. The bottle was then put in an oven at 140° C. and left for an hour. After cooling to 30° C., the glass bottle was broken to collect the methacrylic resin, and the resin was crushed and pulverized to give about 1 cm or less square pieces of polymer (1). The weight average molecular weight of polymer (1) was measured by GPC. Next, raw materials of polymer (2) were put in a 60 L reactor in amounts shown in Table 1, and the temperature of the reactor was adjusted to 80° C. and suspension polymerization was performed for 150 minutes. The temperature was increased to 92° C. at a rate of 1° C./minute, and the mixture was aged for 60 minutes to substantially terminate the polymerization reaction. The resultant was then cooled to 50° C. and 20 wt % sulfuric acid was added thereto to dissolve the suspending agent, and washing, dehydration and drying were performed to give polymer beads. The weight average molecular weight of polymer (2) measured by GPC using the polymer beads is shown in Table 2. The pulverized polymer (1) and polymer beads of polymer (2) were weighed at a ratio of 15:85, put in the tumbler of a twin screw extruder and blended, and then extruded and pelletized at 240° C.

[Resin 9 to Resin 13]

Polymerization using raw materials in the amounts shown in Table 1, measurement and pelletization were performed in the same manner as for resin 1.

[Resin 14 to Resin 16]

Raw materials of polymer (2) were put in a 60 L reactor in amounts added shown in Table 1, and suspension polymerization was performed at 80° C. for 150 minutes. The temperature was increased to 92° C. at a rate of 1° C./minute, and the mixture was aged for 60 minutes to substantially terminate the polymerization reaction. The resultant was then cooled to 50° C. and 20 wt % sulfuric acid was added thereto to dissolve the suspending agent, and washing, dehydration and drying were performed to give polymer beads. The polymer beads were extruded and pelletized by a twin screw extruder at 240° C.

[Resin 17 to Resin 19]

Polymerization using raw materials in the amounts shown in Table 1, measurement and pelletization were performed in the same manner as for resin 1.

[Resin 20 to Resin 22]

Raw materials of polymer (2) were put in a 60 L reactor in the amounts shown in Table 1, and polymerized in the same manner as in resin 14 to give polymer beads. The polymer beads were extruded and pelletized by a twin screw extruder at 240° C.

[Evaluation and Comparison of Properties]

The number of methacrylic resins used in Examples and measurement results of the peak weight average molecular weight Mp, contents of a component having a weight average molecular weight of ⅕ or less of Mp, the average percentage Mh (wt %) of another vinyl monomer unit copolymerizable with methyl methacrylate in the methacrylic resin, which has a weight average molecular weight with a cumulative area dimension of 0 to 2%, the average percentage Ml (wt %) of another vinyl monomer unit copolymerizable with methyl methacrylate in a component of the methacrylic resin, which has a weight average molecular weight with a cumulative area dimension of 98 to 100% are shown in Table 3.

The results of evaluation of practical properties are shown in Table 4.

Examples 1 to 6, Comparative Examples 1 to 6

Experiments were performed using the resins described in Table 3. For the evaluation of practical properties, molding was performed to prepare molded article A and environmental test A was performed.

In Comparative Examples 3 and 4, the percentage of methyl acrylate copolymerizable with methyl methacrylate is out of the range of 1.5 to 20 wt %. In Comparative Example 3, the percentage of the component is high. In this comparative Example, although the spiral length is long and the maximum injection pressure in molding is low, the molded article was significantly deformed after the environmental tests due to low heat resistance. In Comparative Example 4, the percentage of the component is low. In this Comparative Example, the heat resistance and the flowability were high and the maximum pressure in molding was low, but actually, foam called silver is produced in the molded article due to pyrolysis of the resin. Moreover, since the resulting resin has a low molecular weight, the strength is insufficient and many cracks were generated after the environmental tests.

In Comparative Examples 1, 2 and 6, the content of the component having a weight average molecular weight of ⅕ or less of Mp is less than 7%. In Comparative Example 6, although two methacrylic resin compositions having a different molecular weight are used in a mixture, since the difference in the molecular weights is small, the content of the component having a weight average molecular weight of ⅕ or less of Mp is less than 7%. As a result, although the heat resistance in Comparative Examples 1, 2 and 6 is the same as that in Examples 1 to 6, many cracks were generated after the environmental tests of the molded article in Comparative Example 2 due to the low molecular weight. Also, in both Comparative Examples 1 and 6, the spiral length was short and the maximum injection pressure was so high that molding could not be performed with the power of the molding machine. Moreover, since a large amount of molding strain remains in the molded articles, deformation of the molded articles after environmental tests was as much as 10 mm or more.

On the other hand, in Comparative Example 5, the content of the component having a weight average molecular weight of ⅕ or less of Mp is more than 30%. The result is that while there is no problem with the flowability, the resulting resin has poor strength and many cracks were generated after the environmental tests.

In Example 1 to 6, the balance of properties is superior compared to that in Comparative Examples 1 to 6. In Examples 3 and 4, Mh and Ml satisfy the relationship of the formula (1). In these Examples, the flowability is higher and the maximum injection pressure in molding is lower than those in Example 5 in which the formula (1) is not satisfied.

In Example 3, Mh and Ml also satisfy the relationship of the formula (2), and the flowability is still higher and the maximum injection pressure is still lower. In particular, the maximum injection pressure could be reduced to the level controllable by the molding machine.

In Example 6, the content of the component having a weight average molecular weight of ⅕ or less of Mp is more than 20%. Therefore, the strength is slightly lower than those in other Examples and two microcracks of 1 mm or less were generated after the environmental tests. However, the microcracks do not cause any practical problem, and the amount of cracks was significantly smaller than that in Comparative Example 5.

Example 7, Comparative Examples 7 and 8

Comparison was made among resins having a higher percentage of methyl acrylate in the methacrylic resin than those of Examples 1 to 6. In the evaluation of practical properties, molded article B which requires higher flowability was prepared and evaluated in the environmental test B.

In Example 7, the weight average molecular weight is the same as that in Comparative Example 7, but the heat resistance is higher, the spiral length is longer, and the maximum injection pressure in molding of molded article B is lower than those in Comparative Example 7. Further, while no deformation of molded articles occurred in Example 7 after the environmental tests due to the high heat resistance, the heat resistance was insufficient and deformation of molded articles occurred in Comparative Example 7.

In Comparative Example 8, the percentage of methyl acrylate copolymerizable with methyl methacrylate in the methacrylic resin is more than 20 wt %, and therefore, the flowability is extremely high compared to that in Example 7. However, deformation of the molded article occurred to the degree that the molded article was significantly deformed after the environmental tests due to the low heat resistance.

Examples 8 to 12, Comparative Examples 9 and 10

Evaluation was made with a higher weight average molecular weight of the methacrylic resin compared to Examples 1 to 6. These resins have higher solvent resistance.

In Comparative Example 9, although the heat resistance was comparable to that in Examples 8 to 12, the solvent resistance was significantly lower.

In Comparative Example 10, the heat resistance and the solvent resistance were good, but the flowability was significantly lower.

In Example 9, since the content of the component having a weight average molecular weight of ⅕ or less of Mp is higher than 20%, the solvent resistance is slightly lower than those in other Examples, but higher than that in Comparative Example 9.

In Example 10, since Mh and Ml do not satisfy the formula (2), the flowability is lower than those in Examples 8 and 11, but compared to Comparative Example 10 in which the heat resistance is the same, the solvent resistance is about the same and the flowability is higher.

Comparison of Examples 11 and 12 show that the heat resistance and the solvent resistance are comparable, and in Example 11, the flowability is higher than that in Example 12. This is because Mh and Ml satisfy the formula (2) in Example 11.

Example 13, Comparative Examples 11 and 12

In Example 13, the heat resistance is comparable but the flowability is higher compared to those in Comparative Example 11. As a result, molding could be performed at the same injection pressure at a temperature 10° C. lower than that in Comparative Example 11. Moreover, the molding cycle was 20 seconds shorter and the amount of sink mark in the molded article was smaller.

In Comparative Example 12, the heat resistance is higher than that in Example 13, but the flowability is lower and the molding temperature is 25° C. higher. Since the molding temperature is higher even though the heat resistance is high, the molding cycle necessary for keeping the sink mark shorter than 100 μm is long, and in addition, the amount of sink mark is higher than that in Example 13.

TABLE 1

| | polymer (1) common ingredients: deionized water: 26000, tribasic calcium phosphate: 65, calcium carbonate:39, sodium lauryl sulfate: 0.39 | | | | | polymer (2) | | | | washing of suspending agent |
|---|---|---|---|---|---|---|---|---|---|---|
| | methyl methacrylate | methyl acrylate | lauroyl peroxide | 2-ethylhexyl thioglycolate | n-octyl mercaptan | methyl methacrylate | methyl acrylate | lauroyl peroxide | n-octyl mercaptan | 20 wt % sulfuric acid |
| resin 1 | 1920 | — | 15.4 | 144.0 | | 18560 | 854 | 48.5 | 54.7 | 300 |
| resin 2 | 6368 | 32 | 51.2 | 105.6 | | 13934 | 1001 | 37.3 | 41.0 | 300 |
| resin 3 | 2091 | 43 | 17.1 | 68.3 | | 18260 | 941 | 48.0 | 67.2 | 300 |
| resin 4 | 2078 | 55 | 17.1 | 68.3 | | 18318 | 883 | 48.0 | 67.2 | 300 |
| resin 5 | 1813 | 320 | 17.1 | 68.3 | | 18606 | 595 | 48.0 | 67.2 | 300 |
| resin 6 | 1707 | — | 13.7 | 128.0 | | 17175 | 2454 | 49.1 | 55.0 | 300 |
| resin 7 | 1920 | — | 15.4 | 144.0 | | 14561 | 4854 | 485.0 | 53.4 | 300 |
| resin 9 | 3627 | — | 29.0 | | 50.7 | 16433 | 1275 | 44.3 | 35.5 | 300 |
| resin 10 | 6400 | — | 51.2 | | 89.6 | 13740 | 1195 | 37.3 | 20.2 | 300 |
| resin 11 | 3627 | — | 29.0 | | 50.8 | 17354 | 354 | 44.3 | 40.3 | 300 |
| resin 12 | 4246 | 21 | 34.1 | | 119.5 | 16129 | 939 | 42.7 | 29.0 | 300 |
| resin 13 | 3392 | 875 | 34.1 | | 119.5 | 16982 | 85 | 42.7 | 29.0 | 300 |
| resin 17 | 8534 | — | 21.3 | 273.1 | | 12481 | 320 | 32.0 | 22.4 | 300 |

TABLE 1-continued units are all in g

| | | | | | | | | | |
|---|---|---|---|---|---|---|---|---|---|
| resin 18 | 6240 | 160 | 51.2 | 480.0 | 14561 | 373 | 37.3 | 17.9 | 300 |
| resin 19 | 10454 | 213 | 26.7 | — | 9814 | 853 | 26.7 | 38.9 | 300 |

| | polymer (1) | | | | polymer (2) common ingredients: deionized water: 26000, tribasic calcium phosphate: 65, calcium carbonate: 39, sodium lauryl sulfate: 0.39 | | | | washing of suspending agent |
|---|---|---|---|---|---|---|---|---|---|
| | methyl methacrylate | methyl acrylate | lauroyl peroxide | 2-ethylhexyl thioglycolate | methyl methacrylate | methyl acrylate | lauroyl peroxide | n-octyl mercaptan | 20 wt % sulfuric acid |
| resin 8 | 2500 | — | 20.0 | 187.5 | 19200 | 800 | 50.0 | 80.0 | 300 |

| | polymer (2) common ingredients: deionized water: 26000, tribasic calcium phosphate: 65, calcium carbonate: 39, sodium lauryl sulfate: 0.39 | | | | | washing of suspending agent |
|---|---|---|---|---|---|---|
| | methyl methacrylate | methyl acrylate | lauroyl peroxide | 2-ethylhexyl thioglycolate | n-octyl mercaptan | 20 wt % sulfuric acid |
| resin 14 | 19000 | 1000 | 50.0 | — | 86.0 | 300 |
| resin 15 | 19000 | 1000 | 50.0 | — | 100.0 | 300 |
| resin 16 | 15800 | 4200 | 50.0 | — | 58.0 | 300 |
| resin 20 | 16800 | 3200 | 50.0 | — | 86.0 | 300 |
| resin 21 | 18800 | 1200 | 50.0 | — | 58.0 | 300 |
| resin 22 | 19500 | 500 | 50.0 | — | 58.0 | 300 |

TABLE 2

| | polymer (1) | | | polymer (2) | | | content of polymer (1) wt % | content of polymer (2) wt % |
|---|---|---|---|---|---|---|---|---|
| | composition of charged monomers (wt %) | | weight average molecular weight ($\times 10^4$) | composition of charged monomers (wt %) | | weight average molecular weight ($\times 10^4$) | | |
| | methyl methacrylate | methyl acrylate Mah | | methyl methacrylate | methyl acrylate Mal | | | |
| resin 1 | 100.0 | 0.0 | 0.7 | 95.6 | 4.4 | 7.7 | 9 | 91 |
| resin 2 | 99.5 | 0.5 | 2.9 | 93.3 | 6.7 | 10.2 | 30 | 70 |
| resin 3 | 98.0 | 2.0 | 2.1 | 95.1 | 4.9 | 7.5 | 10 | 90 |
| resin 4 | 97.4 | 2.6 | 2.1 | 95.4 | 4.6 | 7.5 | 10 | 90 |
| resin 5 | 85.0 | 15.0 | 2.1 | 96.9 | 3.1 | 7.5 | 10 | 90 |
| resin 6 | 100.0 | 0.0 | 0.7 | 87.5 | 12.5 | 8.1 | 8 | 92 |
| resin 7 | 100.0 | 0.0 | 0.7 | 75.0 | 25.0 | 8.1 | 9 | 91 |
| resin 8 | 100.0 | 0.0 | 0.7 | 96 | 4.0 | 7.9 | 15 | 85 |
| resin 9 | 100.0 | 0.0 | 2.9 | 92.8 | 7.2 | 13.2 | 17 | 83 |
| resin 10 | 100.0 | 0.0 | 2.9 | 92.0 | 8.0 | 18.6 | 30 | 70 |
| resin 11 | 100 | 0.0 | 2.9 | 97.0 | 2.0 | 12.1 | 17 | 83 |
| resin 12 | 99.5 | 0.5 | 1.7 | 94.5 | 5.5 | 14.6 | 20 | 80 |
| resin 13 | 79.5 | 20.5 | 1.7 | 99.5 | 0.5 | 14.6 | 20 | 80 |
| resin 14 | — | — | — | 95.0 | 5.0 | 7.5 | — | 100 |
| resin 15 | — | — | — | 95.0 | 5.0 | 6.6 | — | 100 |
| resin 16 | — | — | — | 79.0 | 21.0 | 10.2 | — | 100 |
| resin 17 | 100.0 | 0.0 | 2.1 | 97.5 | 2.5 | 12.5 | 40 | 60 |
| resin 18 | 97.5 | 2.5 | 0.7 | 97.5 | 2.5 | 8.9 | 30 | 70 |
| resin 19 | 98.0 | 2.0 | 7.0 | 92.0 | 8.0 | 8.5 | 50 | 50 |
| resin 20 | — | — | — | 84.0 | 16.0 | 7.5 | — | 100 |
| resin 21 | — | — | — | 94.0 | 6.0 | 10.2 | — | 100 |
| resin 22 | — | — | — | 97.5 | 2.5 | 10.2 | — | 100 |

TABLE 3

| | | percentage of composition of methacrylic resin (wt %) | | weight average molecular weight (×10⁴) | GPC peak weight average molecular weight (Mp) (×10⁴) | content of components with 1/3 or less of GPC peak weight average molecular weight (%) | Mh having a weight average molecular weight wiyh a cumulative area dimension of 0 to 2% (%) | Ml having a weight average molecular weiyh a cumulative area dimension of 98 to 100% (%) |
|---|---|---|---|---|---|---|---|---|
| | | methyl methacrylate | methyl acrylate | | | | | |
| Ex. 1 | resin 1 | 95.6 | 4.4 | 7.3 | 7.9 | 11.4 | 4.5 | 0.3 |
| Ex. 2 | resin 2 | 95.2 | 4.8 | 8.1 | 6.7 | 8.1 | 6.7 | 0.9 |
| Ex. 3 | resin 3 | 95.5 | 4.5 | 7.0 | 7.4 | 8.9 | 4.9 | 2.3 |
| Ex. 4 | resin 4 | 95.5 | 4.5 | 7.0 | 7.4 | 8.9 | 4.6 | 2.8 |
| Ex. 5 | resin 5 | 95.5 | 4.5 | 7.0 | 7.4 | 8.9 | 3.1 | 13.5 |
| Ex. 6 | resin 8 | 96.7 | 3.3 | 7.7 | 8.8 | 22.1 | 4.1 | 0.2 |
| Comp. Ex. 1 | resin 14 | 95.0 | 5.0 | 7.5 | 6.5 | 4.7 | 5.0 | 5.1 |
| Comp. Ex. 2 | resin 15 | 95.0 | 5.0 | 6.6 | 5.8 | 4.8 | 5.0 | 5.1 |
| Comp. Ex. 3 | resin 16 | 79.1 | 20.9 | 10.2 | 8.7 | 5.3 | 21.0 | 21.0 |
| Comp. Ex. 4 | resin 17 | 98.7 | 1.3 | 6.5 | 6.9 | 18.9 | 2.5 | 0.4 |
| Comp. Ex. 5 | resin 18 | 97.5 | 2.5 | 8.5 | 9.2 | 31.3 | 2.5 | 2.5 |
| Comp. Ex. 6 | resin 19 | 95.0 | 5.0 | 7.5 | 7.1 | 5.3 | 8.0 | 5.5 |
| Ex. 7 | resin 6 | 88.5 | 11.5 | 7.5 | 8.1 | 13.0 | 12.5 | 0.3 |
| Comp. Ex. 7 | resin 20 | 83.5 | 16.5 | 7.5 | 5.8 | 4.9 | 16.3 | 16.5 |
| Comp. Ex. 8 | resin 7 | 78.0 | 22.0 | 7.4 | 8 | 14.5 | 25.1 | 0.3 |
| Ex. 8 | resin 9 | 94.2 | 5.8 | 11.5 | 12.4 | 15.7 | 7.2 | 1.2 |
| Ex. 9 | resin 10 | 94.5 | 5.5 | 13.4 | 14.3 | 25.6 | 8.0 | 0.7 |
| Ex. 10 | resin 11 | 98.3 | 1.7 | 11.9 | 12.7 | 15.2 | 2.0 | 1.2 |
| Ex. 11 | resin 12 | 95.0 | 5.0 | 12.7 | 13.3 | 19.3 | 5.5 | 0.8 |
| Ex. 12 | resin 13 | 95.0 | 5.0 | 12.7 | 13.3 | 19.3 | 0.5 | 19.2 |
| Comp. Ex. 9 | resin 21 | 94.5 | 5.5 | 10.2 | 15.2 | 6.8 | 6.0 | 6.0 |
| Comp. Ex. 10 | resin 22 | 97.5 | 2.5 | 10.2 | 8.7 | 5.3 | 2.5 | 2.5 |
| Ex. 13 | resin 1 | 95.6 | 4.4 | 7.3 | 7.9 | 11.0 | 4.5 | 0.3 |
| Comp. Ex. 11 | resin 14 | 95.0 | 5.0 | 7.5 | 6.5 | 4.7 | 5.0 | 5.1 |
| Comp. Ex. 12 | resin 21 | 97.5 | 2.5 | 10.2 | 8.7 | 5.3 | 2.5 | 2.5 |

TABLE 4

| | | | | evaluation of molding | | | | | | | | |
|---|---|---|---|---|---|---|---|---|---|---|---|---|
| | | | | molded article A, environmental test A | | | molded article B, environmental test B | | | molding test C | | |
| | VICAT (° C.) | spiral length (cm) | time to break (sec) | maximum injection pressure (MPa) | maximum space (mm) | generation of cracks | maximum injection pressure (MPa) | maximum space (mm) | generation of cracks | molding temperature (° C.) | molding cycle (sec) | sink mark (μm) |
| Ex. 1 | 104 | 45.7 | — | 185 | 0.2 | none | — | — | — | — | — | — |
| Ex. 2 | 104 | 45.2 | — | 200 | 0.2 | none | — | — | — | — | — | — |
| Ex. 3 | 104 | 44.9 | — | 195 | 0.2 | none | — | — | — | — | — | — |
| Ex. 4 | 104 | 43.1 | — | 207 | 0.7 | none | — | — | — | — | — | — |
| Ex. 5 | 104 | 41.5 | — | 213 | 0.9 | none | — | — | — | — | — | — |
| Ex. 6 | 104 | 45.5 | — | 185 | 0.2 | two | — | — | — | — | — | — |
| Comp. Ex. 1 | 104 | 39.1 | — | >230 | 3.0 | none | — | — | — | — | — | — |
| Comp. Ex. 2 | 104 | 45.9 | — | 185 | 0.2 | many | — | — | — | — | — | — |
| Comp. Ex. 3 | 82 | 73.3 | — | 160 | 31 mm (maximum value of shrunk up at gate is 13 mm) | none | — | — | — | — | — | — |
| Comp. Ex. 4 | 107 | 43.0 | — | 195 (silver generated) | 0.1 | many | — | — | — | — | — | — |
| Comp. Ex. 5 | 104 | 49.3 | — | 180 | 0.2 | many | — | — | — | — | — | — |
| Comp. Ex. 6 | 104 | 39.7 | — | >230 | 2.0 | none | — | — | — | — | — | — |
| Ex. 7 | 92 | 64.7 | — | — | — | — | 190 | 0.4 | none | — | — | — |
| Comp. Ex. 7 | 88 | 60.3 | — | — | — | — | 220 | 10.3 | none | — | — | — |
| Comp. Ex. 8 | 76 | 80.4 | — | — | — | — | 150 | 41 mm (maximum value of shrunk up at | none | — | — | — |

TABLE 4-continued

| | VICAT (° C.) | spiral length (cm) | time to break (sec) | molded article A, environmental test A | | | molded article B, environmental test B | | | molding test C | | |
|---|---|---|---|---|---|---|---|---|---|---|---|---|
| | | | | maximum injection pressure (MPa) | maximum space (mm) | generation of cracks | maximum injection pressure (MPa) | maximum space (mm) gate is 18 mm) | generation of cracks | molding temperature (° C.) | molding cycle (sec) | sink mark (μm) |
| Ex. 8 | 104 | 30.2 | 103 | — | — | — | — | — | — | — | — | — |
| Ex. 9 | 103 | 30.9 | 65 | — | — | — | — | — | — | — | — | — |
| Ex. 10 | 109 | 28.5 | 89 | — | — | — | — | — | — | — | — | — |
| Ex. 11 | 104 | 29.9 | 99 | — | — | — | — | — | — | — | — | — |
| Ex. 12 | 104 | 28.1 | 98 | — | — | — | — | — | — | — | — | — |
| Comp. Ex. 9 | 104 | 28.3 | 39 | — | — | — | — | — | — | — | — | — |
| Comp. Ex. 10 | 109 | 25.3 | 86 | — | — | — | — | — | — | — | — | — |
| Ex. 13 | 104 | 45.7 | | — | — | — | — | — | — | 190 | 510 | 81 |
| Comp. Ex. 11 | 104 | 39.1 | | — | — | — | — | — | — | 200 | 530 | 93 |
| Comp. Ex. 12 | 109 | 25.3 | | — | — | — | — | — | — | 215 | 600 | 95 |

INDUSTRIAL APPLICABILITY

Use of the high flowability methacrylic resin of the present invention makes it possible to improve molding properties of molded articles in molding while maintaining the appearance, and provide molded articles with reduced occurrence of problems such as warpage and generation of cracks in molded articles in environmental tests in display (device) windows of cell phones, liquid crystal monitors and liquid crystal TVs, light guide plates used in liquid crystal displays, front panels of display devices, frames of paintings, windows for incoming outside light, display signboards, exterior goods such as roofs of carports, sheets for exhibition racks, lighting covers and globes, molded articles which undergo secondary processing such as air pressure forming, vacuum forming and blow molding and optical parts of vehicles used for tail lamps and headlamps, which are thin-walled and large and require resistance for solvents such as alcohol detergents, waxes and wax removers.

The invention claimed is:

1. A methacrylic resin characterized in that the methacrylic resin comprises 80 to 98.5 wt % of methyl methacrylate monomer unit and 1.5 to 20 wt % of at least one different vinyl monomer unit copolymerizable with methyl methacrylate, has a weight average molecular weight measured by gel permeation chromatography (GPC) of 60,000 to 230,000 and comprises 7 to 30% of a component having a weight average molecular weight of ⅕ or less of a peak weight average molecular weight (Mp) obtained from a GPC elution curve, based on the methacrylic resin component.

2. The methacrylic resin according to claim 1, characterized in that an average percentage Mh (wt %) of another vinyl monomer unit copolymerizable with methyl methacrylate in a methacrylic resin having a weight average molecular weight such that a cumulative area dimension (%) of area dimensions in the GPC elution curve is 0 to 2% and an average percentage Ml (wt %) of another vinyl monomer unit copolymerizable with methyl methacrylate in a methacrylic resin having a weight average molecular weight such that a cumulative area dimension (%) is 98 to 100% have a relationship of the formula (1):

$$(Mh-0.8) \geq Ml \geq 0 \tag{1}$$

3. The methacrylic resin according to claim 1, characterized in that an average percentage Mh (wt %) of another vinyl monomer unit copolymerizable with methyl methacrylate in a methacrylic resin having a weight average molecular weight such that a cumulative area dimension (%) of area dimensions in the GPC elution curve is 0 to 2% and an average percentage Ml (wt %) of another vinyl monomer unit copolymerizable with methyl methacrylate in a methacrylic resin having a weight average molecular weight such that a cumulative area dimension (%) is 98 to 100% have a relationship of the formula (2):

$$(Mh-2) \geq Ml \geq 0 \tag{2}$$

4. The methacrylic resin according to claim 1, characterized in that the methacrylic resin has a weight average molecular weight of 60,000 to 180,000.

5. The methacrylic resin according to claim 1, characterized in that the resin comprises 8 to 20% of the component having a weight average molecular weight of ⅕ or less of a peak weight average molecular weight (Mp) in the GPC elution curve, based on the methacrylic resin component.

6. A process for producing a methacrylic resin having a weight average molecular weight measured by gel permeation chromatography (GPC) of 60,000 to 230,000 and comprising 7 to 30% of a component having a weight average molecular weight of ⅕ or less of a peak weight average molecular weight (Mp) in a GPC elution curve, characterized in that the process comprises the steps of:

preparing 5 to 40 wt %, based on the whole methacrylic resin, of a copolymer (1) which comprises 80 to 98.5 wt % of methyl methacrylate monomer unit and 1.5 to 20 wt % of a monomer unit composed of at least one different vinyl monomer copolymerizable with methyl methacrylate and has a weight average molecular weight measured by gel permeation chromatography of 5,000 to 50,000;

and preparing 95 to 60 wt %, based on the whole methacrylic resin, of a copolymer (2) having a weight average molecular weight of 70,000 to 250,000 by adding a raw material mixture containing methyl methacrylate in the presence of the copolymer (1).

7. The process for producing a methacrylic resin according to claim 6, characterized in that a percentage Mal (wt %) of another vinyl monomer copolymerizable with methyl methacrylate in the copolymer (1) and a percentage Mah (wt %) of another vinyl monomer copolymerizable with methyl methacrylate in the copolymer (2) have a relationship of the formula (3):

$$(Mah-0.8) \geq Mal \geq 0 \tag{3}.$$

8. The process for producing a methacrylic resin according to claim 6, characterized in that Mah (wt %) in the copolymer (1) and Mal (wt %) in the copolymer (2) have a relationship of the formula (4):

$$(Mah-2) \geq Mal \geq 0 \tag{4}.$$

9. The process for producing a methacrylic resin according to claim 6, characterized in that the methacrylic resin has a weight average molecular weight of 60,000 to 180,000.

10. The process for producing a methacrylic resin according to claim 6, characterized in that the resin comprises 8 to 20% of a component having a weight average molecular weight of $1/5$ or less of a peak weight average molecular weight (Mp) in the GPC elution curve, based on the methacrylic resin component.

11. A molded article of the methacrylic resin according to claim 1, which has a maximum thickness of 1.5 mm or less.

12. A molded article of the methacrylic resin according to claim 1, which has a maximum thickness of 10 mm or more.

13. The process for producing a methacrylic resin according to claim 7, characterized in that the resin comprises 8 to 20% of a component having a weight average molecular weight of $1/5$ or less of a peak weight average molecular weight (Mp) in the GPC elution curve, based on the methacrylic resin component.

14. The process for producing a methacrylic resin according to claim 8, characterized in that the resin comprises 8 to 20% of a component having a weight average molecular weight of $1/5$ or less of a peak weight average molecular weight (Mp) in the GPC elution curve, based on the methacrylic resin component.

15. The process for producing a methacrylic resin according to claim 9, characterized in that the resin comprises 8 to 20% of a component having a weight average molecular weight of $1/5$ or less of a peak weight average molecular weight (Mp) in the GPC elution curve, based on the methacrylic resin component.

16. The molded article of the methacrylic resin according to claim 2, which has a maximum thickness of 1.5 mm or less.

17. The molded article of the methacrylic resin according to claim 3, which has a maximum thickness of 1.5 mm or less.

18. The molded article of the methacrylic resin according to claim 4, which has a maximum thickness of 1.5 mm or less.

19. The molded article of the methacrylic resin according to claim 5, which has a maximum thickness of 1.5 mm or less.

20. The molded article of the methacrylic resin according to claim 2, which has a maximum thickness of 10 mm or more.

21. The molded article of the methacrylic resin according to claim 3, which has a maximum thickness of 10 mm or more.

22. The molded article of the methacrylic resin according to claim 4, which has a maximum thickness of 10 mm or more.

23. The molded article of the methacrylic resin according to claim 5, which has a maximum thickness of 10 mm or more.

\* \* \* \* \*

UNITED STATES PATENT AND TRADEMARK OFFICE
CERTIFICATE OF CORRECTION

| | | |
|---|---|---|
| PATENT NO. | : 7,964,690 B2 | Page 1 of 1 |
| APPLICATION NO. | : 11/992382 | |
| DATED | : June 21, 2011 | |
| INVENTOR(S) | : Naoki Azuma et al. | |

It is certified that error appears in the above-identified patent and that said Letters Patent is hereby corrected as shown below:

First Page, Column 1 Item 54 (Title), Line 2, Delete "THEREROF" and insert -- THEREOF --, therefor.
Column 1, Line 2, Delete "THEREROF" and insert -- THEREOF --, therefor.

Signed and Sealed this
Sixteenth Day of August, 2011

David J. Kappos
*Director of the United States Patent and Trademark Office*